United States Patent [19]

Windisch

[11] 4,020,458
[45] Apr. 26, 1977

[54] LIGHT SIGNALLING DEVICE FOR BICYCLES AND SWITCH THEREFOR

[76] Inventor: Anthony Jude Windisch, 3882 Walsh St., St. Louis, Mo. 63116

[22] Filed: Feb. 27, 1976

[21] Appl. No.: 661,952

[52] U.S. Cl. .............................. 340/67; 340/134; 200/61.27
[51] Int. Cl.² .................. H01H 3/16; H01H 9/26; B60Q 1/00
[58] Field of Search ............... 340/67, 73, 134, 94; 200/1 R, 61.27, 5 R

[56] References Cited

UNITED STATES PATENTS

| | | | |
|---|---|---|---|
| 1,716,370 | 6/1929 | Dark et al. | 340/73 |
| 1,893,371 | 1/1933 | Knowlton | 340/94 |
| 2,223,678 | 12/1940 | Elliott | 200/61.27 X |
| 2,302,098 | 11/1942 | Birk et al. | 340/73 UX |
| 2,593,337 | 4/1952 | O'Brien | 200/61.27 |
| 3,492,640 | 1/1970 | White | 340/67 |

FOREIGN PATENTS OR APPLICATIONS 666,977  2/1952  United Kingdom ............... 340/73

Primary Examiner—Donald J. Yusko
Attorney, Agent, or Firm—James R. Bell

[57] ABSTRACT

A light signalling device is provided for use with bicycles and includes a housing and a cover mounted on the housing. The cover includes at least two like-colored light penetrable portions and at least one light penetrable portion different in color from the like-colored portions and positioned to separate the two like-colored portions. Light emitting lamps are mounted in the housing for separately illuminating each light penetrable portion. A multipositionable switch is connected for controlling illumination of the light penetrable portions in various arrays. The switch is positionable to simultaneously interrupt illumination of each portion; to intermittently illuminate only the one portion; to simultaneously illuminate only the two like-colored portions; to alternately illuminate the one portion and one of the two like-colored portions; and to alternately illuminate the one portion and another of the two like-colored portions.

6 Claims, 5 Drawing Figures

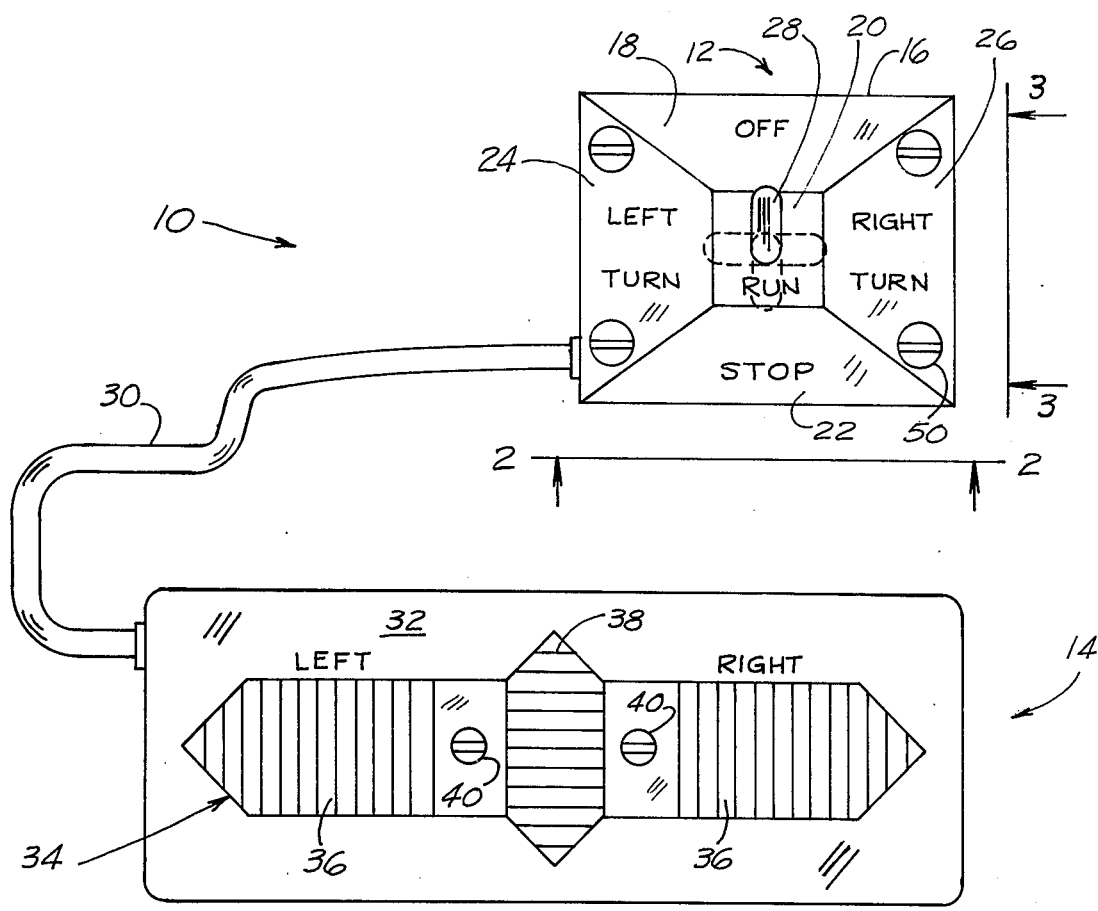
FIG. 1
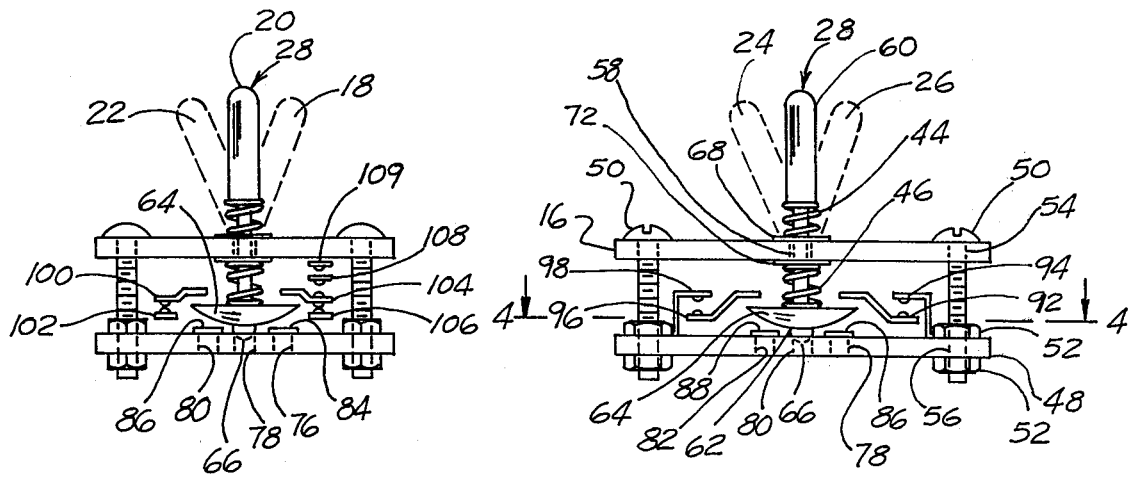
FIG. 3
FIG. 2

LIGHT SIGNALLING DEVICE FOR BICYCLES AND SWITCH THEREFOR

BACKGROUND OF THE INVENTION

1. Field Of The Invention

This invention relates generally to signals and indicators and more particularly to those used in connection with vehicles to indicate motion and direction.

2. Discussion Of The Prior Art

Generally, lighting devices are available for bicycles in various forms. Such devices, usually battery powered, may provide turn signal indicators or may provide running lights. Rarely, if ever, do such devices provide stop lights. The turn signal indicators and the running lights are usually part of separate units provided for installation on a bicycle. Left and right turn signal indicators are mounted to the left and right of center, respectively, of the bicycle when viewed from the rear. Since a bicycle has a rather narrow silhouette when viewed from the rear, it may be difficult to distinguish, from a distance, whether a single flashing turn signal indicator is located either to the left or right of the center of the silhouette even when the indicators are spaced apart. It would be of benefit therefore to have a lighting device for bicycles having preferably on a single console, a running light, stop lights and turn signal indicators which are referenced in some manner to indicate their position relative to either the left or right of center.

SUMMARY OF THE INVENTION

Accordingly, the present invention provides a light device for bicycles having a battery powered console or housing including a running light, stop lights and turn signal indicators. The running light is mounted in the center of the console and displays a certain color and shape. Each of the like-colored stop lights are different in color and shape from the running light, are mounted to the left and right of the running light, respectively, and are separated thereby. The stop lights also function as the turn signal indicators. A multi-positionable switch is connected for controlling display of the lights in different arrays. The switch is positionable to simultaneously interrupt illumination of each light; to intermittently illuminate the running light; to simultaneously illuminate only the stop lights; to alternately illuminate the running light and one of the stop/turn signal lights in timed sequence; and to alternately illuminate the running light and the other stop/turn signal light in timed sequence.

Other advantages and novel features of the invention will become apparent from the following detailed description of the invention when considered in conjuction with the accompanying drawings.

BRIEF DESCRIPTION OF THE DRAWINGS

In the drawings wherein like parts are marked alike:

FIG. 1 is a plan view illustrating the lighting system of this invention including a switch and an associated lighting housing;

FIG. 2 is a side view of the switch taken along line 2—2 of FIG. 1;

FIG. 3 is an end view of the switch taken along line 3—3 of FIG. 1;

DETAILED DESCRIPTION OF THE INVENTION

Figure 4:
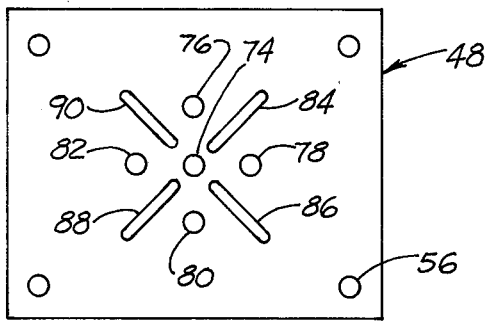
FIG. 4 is a top view of the lower portion of the switch taken along line 4—4 of FIG. 2.

Referring now to the drawings, FIG. 1 illustrates generally a light signalling device 10 suitable for mounting on bicycles and including a multi-positionable toggle switch 12 operably connected for controlling a lighting display console 14. Switch 12 includes a face or support portion 16 having a display of five positions including "off" position 18, "run" position 20, "stop" position 22, "left turn" position 24 and "right turn" position 26. Each position is selectable by pivoting position selection lever 28 toward the position desired. Console 14 operably connected to switch 12 by any suitable conductor 30 and includes housing 32 having cover 34 mounted thereon. Cover 34 includes at least two like-colored light penetrable portions 36 indicated as being red and at least one light penetrable portion 38 different in color from portions 36 and indicated as being blue so as to contrast with portions 36 when illuminated. Light emitting lamps, to be discussed later in greater detail, are mounted in the housing directly behind The light penetrable portions for separately illuminating each portion. Preferably, blue portion 38 is mounted between and separates red portions 36. Cover 34 may be mounted on housing 32 such as by screws 40 or the like. Light penetrable portions 36, 38 are preferably of a reflective type plastic material such as is well known for use with vehicle lighting devices and housing 32 may be of either a suitable metal or durable plastic material. Also, a mounting bracket, not shown, may be attached to housing 32 for mounting console 14 for display preferably on the rear of a bicycle although such a console can be mounted both front and rear of a bicycle if desired.

In FIG. 2, switch 12 includes main support member 16 and position selector or toggle-type lever 28 resiliently mounted for pivotal movement on support member 16 by springs 44, 46. Another support member 48 is mounted on and spaced from main support 16 by screws 50 and nuts 52, or the like. Openings 54, 56 are provided in support members 16, 48, respectively, to accommodate screws 50. Opening 58 is provided in support member 16 to accommodate position selector 28. Selector 28 protrudes from support 16 and terminates at enlarged diameter first end 60 and extends through support 16 at opening 58 to terminate at second end 62. Second end 62 includes generally disc-shaped, non-conductive striker 64. A rounded or beaded portion 66 is at second end 62 and extends beyond striker 64. First spring 44 is compressed between first end 60 and washer 68 above support 16 whereas second spring 46 is compressed between striker 64 and washer 72 placed between main support 16 and support 48, as shown in the drawing. Five openings or position selection retainers 74, 76, 78, 80 and 82 are provided in support 48 in spaced relationship with support 16 for accommodating beaded portion 66 upon pivotal movement of selector 28 due to force exerted by spring 46 in urging beaded portion 66 toward support 48. As a result of the engagement of beaded portion 66 in any of the openings, a positive positioning of switch selector 28 is achieved in its desired position. The retainers can be best understood by coordinating FIGS. 2–4. Position selection guides 84, 86, 88, 90 are mounted on support 48 for spaced relationship with main support 16. Such guides may be raised elongated portions formed on or attached to support 48 so as to guide beaded portion 66 to its desired retainer upon pivotal movement of selector 28. The retainers and guides can be best understood by coordinating FIGS. 2-4. Contact member 92, FIG. 2, is generally a flexible conductor and is provided on switch 12 to be urged into contact with contact member 94 by striker 64 upon pivotal movement of selector 28 to left turn position 24, shown in phantom outline. Selector 28 is guided into position 24 by guides 84, 86 guiding beaded portion 66 therebetween and urged into retainer 78 by spring 46 when beaded portion 66 and retainer opening 78 are aligned. Contact member 96, FIG. 2, is also generally a flexible conductor and is provided on switch 12 to be urged into contact with contact member 98 by striker 64 upon pivotal movement of selector 28 to right turn position 26 shown in phantom outline. Selector 28 is guided into position 26 by guides 88, 90 guiding beaded portion 66 therebetween and urged into retainer 82 by spring 46 when beaded portion 66 and retainer 82 are aligned. Contact member 100, FIG. 3, is also a flexible conductor and is provided on switch 12 to be urged out of contact with contact member 102 by striker 64 upon pivotal movement of selector 28 to off position 18 shown in phantom outline. Selector 28 is guided into position 18 by guides 86, 88 guiding beaded portion 66 therebetween and urged into retainer 80 by spring 46 when beaded portion 66 and retainer 80 are aligned. Contact member 104, FIG. 3, is also a flexible conductor and is provided on switch 12 to be urged and out of contact with contact member 106 and into contact with contact members 108 and 109 by striker 64 upon pivotal movement of selector 28 to stop position 22 shown in phantom outline. Selector 28 is guided into position 22 by guides 84, 90 guiding beaded portion 66 therebetween and urged into retainer 76 by spring 46 when beaded portion 66 and retainer 76 are aligned. When selector 28 is in the vertical or run position 20, beaded portion 66 is urged into retainer 74 due to spring 46 and alignment of beaded portion 66 with retainer 74.

Figure 5:
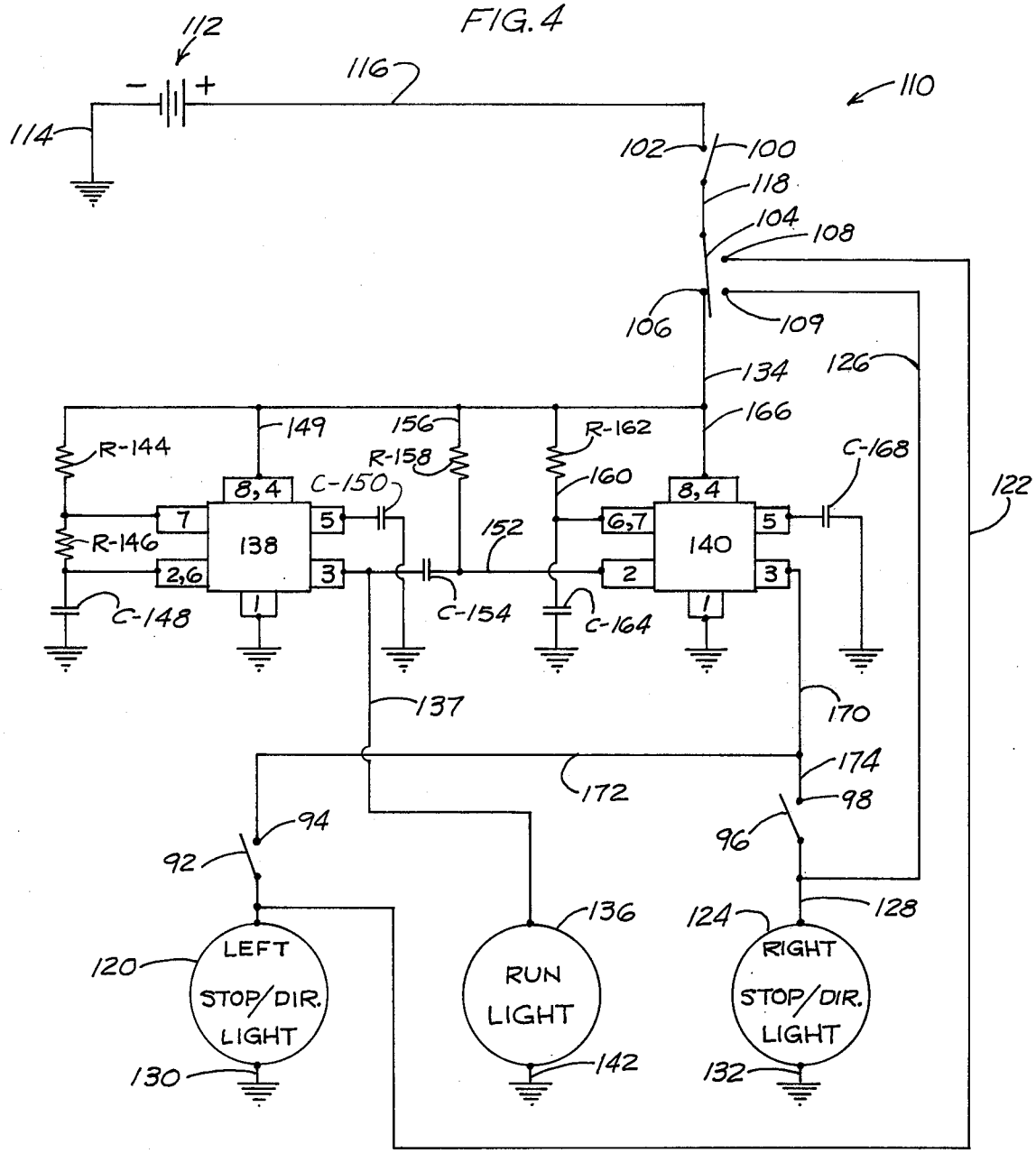
FIG. 5 is a schematic illustration of the wiring diagram and associated components of the lighting system of this invention.

In FIG. 5, a schematic illustration of the wiring diagram for the light signalling device is generally designated 110 and comprises a power source 112 including four commonly available 1.5 volt d.c. size "D" batteries in series in housing 32 resulting in a total power output of 6 volts d.c. The negative side of the power source is appropriately wired to ground by any suitable conductor 114 and the positive side is connected to contact 102 of switch 12 by conductor 116. Contact 100 is illustrated in the open position out of contact with 102 which as illustrated in FIG. 3 would place selector 28 in "off" position 18. However, when selector 28 is in "run" position 28, as illustrated in FIG. 3, contacts 100,102 are made. Contact 100, FIG. 5, is connected to contact 104 by conductor 118. Contact 104 is illustrated in the closed position or In contact with 108 and 109 by striker 64 when selector 28 is in "stop" position 22. With contact 100,102 made, when contact is made between 104 and 108, 109, current is conducted to lamp 120 or left stop/direction light via contact 108 and conductor 122 and to lamp 124 or right stop/direction light via contact 109 and conductors 126, 128 thus resulting in the simultaneous and continuous illumination of lamps 120, 124 and an illuminated display of red portions 36. Lamp 120 is connected to ground at 130 and lamp 124 is connected to ground at 132. With contacts 100, 102 made, and with contacts 104, 106 made, stop/direction lamps 120, 124 are off and current is conducted to conductor 134 and ultimately to lamp or run light 136 via conductor 137 and due to the introduction of timer circuits 138, 140 and certain capacitors and resistors, the result is an intermittent illumination of lamp 136 and an intermittent display of blue portion 38. Lamp 136 is connected to ground 142. Timer circuit 138 is connected to conductor 134 at reset pins 8 and 4 via conductor 149, at pin 7 via resistor R-144, a commonly available 4.7 k-ohm resistor, and at pins 2 and 6 via resistor R-146, a commercially available 150 k-ohm resistor in series with R-144. Pin 1 of timer 138 is connected to ground. Also, other grounding connections are made through C-148, a commercially available 5 micro-farad capacitor and at pin 5 through C-150 a commercially available 0.01 micro-farad capacitor. Timer 138 is a commercially available linear integrated timer circuit such as, for example, the product type 555 Integrated Circuit Timer catalogue number 276-1723 sold under the Trademark ARCHER. Such a timer circuit is a highly stable controller capable of producing oscillation or accurate time delays. For stable operation as an oscillator, the free running frequency and the duty cycle are both accurately controlled with external resistors R-144, 146 and capacitors C-148, 150.

Timer 140 is the same linear integrated circuit as timer 138 but is connected to function as a timed "off" circuit triggered on by the influence of timer 138 particularly when there is no output at pin 3 of timer 138. Conductor 152 interconnects pin 3 of timer 138 and pin 2 of timer 140 and includes commercially available capacitor C-154, a 2 microfarad capacitor. Conductor 156 interconnects conductors 134, 152 and includes commercially available resistor R-158, a 27 k-ohm resistor. Conductor 160 interconnects conductor 134 and pins 6 and 7 of timer 140 and includes commercially available resistor R-162, a 33 k-ohm resistor. conductor 160 continues to ground and includes commercially available capacitor C-164, a 10 micro-farad capacitor. Conductor 166 interconnects conductor 134 and pins 8 and 4 of timer 140. Pin 5 of timer 140 is connected to ground via commercially available capacitor C-168, a 0.01 micro-farad capacitor. Pin 1 of timer 140 is connected to ground. Output pin 3 of timer 140 can be connected to lamps 120, 124 via conductors 170, 172 and 174. When it is desired to signal for a left turn, it can be seen by reference to FIGS. 2 and 5 that placing selector 28 in the "left turn" position 24 makes contact between 92, 94. Thus output from pin 3 of timer 140 is conducted to lamp 120 via conductors 170, 172. When it is desired to signal for a right turn, it can be seen by reference to FIGS. 2 and 5 that placing selector 28 in "right turn" position 26 makes contact between 96, 98. Thus, output from pin 3 of timer 140 is conducted to lamp 124 via conductors 170, 174.

In operation, with the above described parts assembled as shown in the drawings, selector 28 is in "off" position 18 and striker 64 maintains contacts 100,102 open. Selector 28 is then placed in "run" position 20 so that contacts 100,102 and 104,106 are closed. Thus, control voltage from power source 112 is conducted via conductor 134 to pins 8 and 4 of timer circuit 138 and is further conducted to run light 136 via pin 3 of circuit 138 and conductor 137. With timer circuit 138 connected as a continuous timer circuit, resistors R-144, 146 and capacitor C-148 are building to a threshold point. When that threshold is reached C-148 discharges and shuts down output at pin 3. After a short duration, C-150 discharges and current then begins to flow from pin 3 to run light 136 due to reset power available at pins 8 and 4 causing the cycle to be repeated. The resulting oscillations cause intermittent illumination of run light 136 and an intermittent display at portion 38. That is, the blue "run light" display portion 38 flashes on and off continuously.

A left turn signal is produced by placing selector 28 in left turn position 24 so that striker 64 urges contact 92 against contact 94. The output from pin 3 of timer 138 continues to send intermittent signals to lamp 136. Timer 140 receives control voltage at pins 8 and 4 thereof. Resistor R-162 and capacitor C-164 are building to a threshold point. When that threshold point is reached C-164 discharges and shuts down output at pin 3 of timer 140. When output from pin 3 of timer 138 shuts down, timer 140 is triggered on to produce output at pin 3 of timer 140. Thus, when there is output from pin 3 of timer 138, power goes directly to run light 136 for the intermittent blue flashing effect. When timer 138 shuts down this acts as a negative trigger due to the interrelationship of resistor R-158 and capacitor C-154 thus producing power output at pin 3 of timer 140 which is conducted via conductors 170, 172, contacts 92, 94 to left turn lamp 120 causing an intermittent red flashing thereof. Upon repeat of this cycle, it can be seen that the result is the alternate flashing of blue portion 38 and red left turn portion 36.

A right turn signal is produced by placing selector 28 in right turn position 26 so that striker 64 urges contact 96 against contact 98. With contacts 96, 98 closed and contacts 92, 94 open the result is an intermittent alternating flashing of blue portion 38 and red right turn portion 36 due to the above described complimentary operation of timers 138 and 140. The values of the resistors and capacitors are such that during either a right or left turn, the duration of blue light display is longer than the duration of red light display.

A "stop" signal is actuated by pivoting selector 28 into the stop position 22 so that contact 104 is urged out of contact with 106 and into contact with both 108 and 109. This interrupts the previous source of power to timers 138, 140 and simultaneously conducts control voltage to left and right lamps 120, 124 thus producing a steady illumination of both red portions 36.

The foregoing has described a lighting device for bicycles and a five position toggle switch therefor. The lighting device signals a flashing blue light signal in the "run" mode, an alternating flashing blue/red signal in either the right or left turn modes and a steady red signal in the "stop" mode.

Many modifications and variations of the present invention are possible in the light of the above teachings. It is therefor to be understood that within the scope of the appended claims the invention may be practiced otherwise than as specifically described.

What is claimed is:

1. A light signalling device for bicycles comprising, in combination:
   a. a housing;
   b. a cover mounted on the housing;
   c. at least two like-colored light penetrable portions in the cover;
   d. at least one light penetrable portion different in color from the like-colored portions; (and)
   e. light emitting lamp means mounted in the housing for separately illuminating each light penetrable portion (.) ;
   f. the one light penetrable portion, different in color from the two like-colored portions, separates the two like-colored portions;
   g. multi-positionable switch means connected for controlling illumination of the light penetrable portions in various arrays and positionable for:
      1. simultaneously interrupting illumination for each portion;
      2. intermittently illuminating only the one portion;
      3. simultaneously illuminating only the two like-colored portions;
      4. alternately illuminating the one portion and one of the two like-colored portions; and
      5. alternately illuminating the one portion and another of the two like-colored portions.

2. A light signalling device for bicycles comprising, in combination:
   a. a housing;
   b. a cover mounted on the housing;
   c. at least two like-colored light penetrable portions in the cover;
   d. at least one light penetrable portion different in color from the like-colored portions;
   e. light emitting lamp means mounted in the housing for separately illuminating each light penetrable portion; (and)
   f. multi-positionable switch means connected for controlling illumination of the light penetrable portions in various arrays, (the switch including) and positionable for:
      1. simultaneously interrupting illumination for each portion;
      2. intermittently illuminating only the one portion;
      3. simultaneously illuminating only the two like-colored portions;
      4. alternately illuminating the one portion and one of the two like-colored portions; and
      5. alternately illuminating the one portion and another of the two like-colored portions; and
   g. the switch comprising;
      1. a first support member;
      2. a second support member;
      3. means for interconnecting and maintaining the first and second support members in relatively parallel spaced relationship;
      4. a switch lever pivotal at the first support member including first and second ends, the lever extending through the first support member and terminating at the second end in abutting relationship with the second support member;
      5. a handle portion on the first end of the switch lever terminating in spaced relationship with the first support member;
      6. a striker member on the second end of the switch lever;
      7. a beaded member superimposed on and protruding beyond the striker member at the second end of the switch lever;
      8. a first resilient member on the switch lever compressed between the handle and the first support member; and
      9. a second resilient member on the switch lever compressed between the striker and the first support member.

3. A switch comprising:

a. a first support member;

b. a second support member; (position selection means resiliently mounted for pivotal movement on the support member; and)

c. means for interconnecting and maintaining the first and second support members in relatively parallel spaced relationship; (position selection guide means on and in spaced relationship with the support member for guiding a portion of the position selection means.)

d. a switch lever pivotal at the first support member including first and second ends, the lever extending through the first support member and terminating at the second end in abutting relationship with the second support member;

e. a handle portion on the first end of the switch lever terminating in spaced relationship with the first support member;

f. a striker member on the second end of the switch lever;

g. a beaded member superimposed on and protruding beyond the striker member at the second end of the switch lever;

h. a first resilient member on the switch lever compressed between the handle and the first support member; and i. a second resilient member on the switch lever compressed between the striker and the first support member.

4. The switch of claim 3, and further including:
a plurality of position selection retention means (on and in spaced relationship with the) formed in the second support member for retaining the (portion of the position selection means) beaded member in preselected positions when the switch lever is pivoted at the first support member.

5. The switch of claim 4, (wherein) and further including:
(the) position selection guide means (protrudes from the support means and extends therethrough into contact with the retention means) on the second support member for guiding the beaded member to a preselected one of the position selection retention means when the switch lever is pivoted at the first support member.

6. The switch of claim 5, and further including:
(means for resiliently mounting the position selection means on the support member) a plurality of contact means mounted between the first and second support members for contact with the striker member and for circuit making and breaking engagement therebetween when the switch lever is pivoted at the first support member.

* * * * *

UNITED STATES PATENT AND TRADEMARK OFFICE
CERTIFICATE OF CORRECTION

PATENT NO. : 4,020,458
DATED : April 26, 1977
INVENTOR(S) : Anthony Jude Windisch It is certified that error appears in the above-identified patent and that said Letters Patent are hereby corrected as shown below:

Claim 1, line 8, delete "(and)"
Claim 1, line 11, delete "(.)"

Claim 2, line 11, delete "(and)"
Claim 2, line 14, delete "(the switch including)"

Claim 3, lines 3-5, delete "(position selection means resiliently mounted for pivotal movement on the support member; and)"
Claim 3, lines 8-11, delete "(position selection guide means on and in spaced relationship with the support member for guiding a portion of the position selection means.)"

Claim 4, lines 2-3, delete "(on and in spaced relationship with the)"
Claim 4, lines 4-5, delete "(portion of the position selection means)"

Claim 5, line 1, delete "(wherein)"
Claim 5, line 3, delete "(the)"
Claim 5, lines 3-5, delete "(protrudes from the support means and extends therethrough into contact with the retention means)"

Claim 6, lines 2-3, delete "(means for resiliently mounting the position selection means on the support members)".

Signed and Sealed this

Twentieth Day of September 1977

[SEAL]

Attest:

RUTH C. MASON
Attesting Officer

LUTRELLE F. PARKER
Acting Commissioner of Patents and Trademarks